(12) United States Patent
Boström et al.

(10) Patent No.: US 6,586,509 B1
(45) Date of Patent: Jul. 1, 2003

(54) COMPOSITION FOR ELECTRIC CABLES COMPRISING THIODIOL FATTY ACID DIESTERS

(75) Inventors: Jan-Ove Boström, Ödsmål (SE); Ruth Dammert, Västra Frölunda (SE); Bill Gustafsson, Stenungsund (SE); Annika Smedberg, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 3 days.

(21) Appl. No.: 09/749,500

(22) Filed: Dec. 26, 2000

Related U.S. Application Data

(63) Continuation of application No. PCT/SE99/01196, filed on Jul. 1, 1999.

(30) Foreign Application Priority Data

Jul. 3, 1998 (SE) ................................................ 9802386

(51) Int. Cl.$^7$ ............................ H01B 3/44; C08L 23/06; C08K 5/372
(52) U.S. Cl. ...................... 524/302; 524/289; 524/291; 524/303; 524/304; 524/392; 524/585
(58) Field of Search ............................... 524/289, 291, 524/167, 392, 302, 303, 304, 585

(56) References Cited

U.S. PATENT DOCUMENTS

| | | |
|---|---|---|
| 3,646,155 A | 2/1972 | Scott |
| 3,666,715 A * | 5/1972 | Kutner et al. ............ 260/45.8 N |
| 3,749,629 A | 7/1973 | Andrews et al. |
| 4,117,195 A | 9/1978 | Swarbrick et al. |
| 4,286,023 A | 8/1981 | Ongchin |
| 4,297,310 A | 10/1981 | Akutsu et al. |
| 4,335,004 A * | 6/1982 | Efner ......................... 508/444 |
| 4,351,876 A | 9/1982 | Doi et al. |
| 4,397,981 A | 8/1983 | Doi et al. |
| 4,413,066 A | 11/1983 | Isaka et al. |
| 4,446,283 A | 5/1984 | Doi et al. |
| 4,456,704 A | 6/1984 | Fukumura et al. |
| 4,547,551 A | 10/1985 | Bailey et al. |
| 4,576,993 A | 3/1986 | Tamplin et al. |
| 4,795,482 A | 1/1989 | Gioffre et al. |
| 4,812,505 A | 3/1989 | Topcik |
| 4,970,278 A | 11/1990 | Komabashiri et al. |
| 5,047,468 A | 9/1991 | Lee et al. |
| 5,149,738 A | 9/1992 | Lee et al. |
| 5,187,009 A * | 2/1993 | Kimura et al. ............... 428/383 |
| 5,225,469 A | 7/1993 | Maringer et al. |
| 5,380,803 A * | 1/1995 | Coutant et al. ............. 525/240 |
| 5,382,631 A | 1/1995 | Stehling et al. |
| 5,393,823 A | 2/1995 | Konno et al. |
| 5,453,322 A | 9/1995 | Keogh et al. |
| 5,521,264 A | 5/1996 | Mehra et al. |
| 5,574,816 A | 11/1996 | Yang et al. |
| 5,580,493 A | 12/1996 | Chu et al. |
| 5,582,923 A | 12/1996 | Kale et al. |
| 5,639,825 A | 6/1997 | Nanbu et al. |
| 5,718,974 A | 2/1998 | Kmiec |
| 5,719,218 A | 2/1998 | Sarma |
| 5,731,082 A | 3/1998 | Gross et al. |
| 5,736,258 A | 4/1998 | Moy |
| 5,798,427 A | 8/1998 | Foster et al. |
| 5,807,635 A | 9/1998 | Cogen et al. |
| 5,891,979 A | 4/1999 | Dammert et al. |
| 6,005,055 A | 12/1999 | Dammert et al. |
| 6,165,387 A | 12/2000 | Gustafsson et al. |

FOREIGN PATENT DOCUMENTS

| | | |
|---|---|---|
| EP | 0 040 992 B1 | 5/1984 |
| EP | 0 041 796 B1 | 8/1984 |
| EP | 0 207 627 A3 | 1/1987 |
| EP | 0 207 627 A2 | 1/1987 |
| EP | 0 022 376 B1 | 3/1987 |
| EP | 0 214 099 A2 | 3/1987 |
| EP | 0 237 294 A2 | 9/1987 |
| EP | 0 318 841 A2 | 6/1989 |
| EP | 0 334 993 A2 | 10/1989 |
| EP | 0 348 978 A2 | 1/1990 |
| EP | 0 369 436 A2 | 5/1990 |
| EP | 0 193 317 B1 | 9/1990 |
| EP | 0 401 540 A2 | 12/1990 |
| EP | 0 460 936 A1 | 12/1991 |
| EP | 0 475 064 A1 | 3/1992 |
| EP | 0 497 530 A2 | 8/1992 |
| EP | 0 533 160 A1 | 3/1993 |
| EP | 0 535 230 A1 | 4/1993 |

(List continued on next page.)

OTHER PUBLICATIONS

Cornelio [(Centro Ric. Soc. "Polymer" Terni, Italy) Aliphatic isomeric thio ester with liner side alkyl chains. Chim. Ind. (Milan), 47(3), pp. 263–270 (1965)].*

(List continued on next page.)

*Primary Examiner*—Kelechi Egwim
(74) *Attorney, Agent, or Firm*—Merchant & Gould P.C.

(57) ABSTRACT

A composition for an insulating layer of an electric cable wherein the composition contains an ethylene plastic as the base resin and further contains up to about 5% by weight of additives including antioxidant, and peroxide cross-linking agent. The composition is characterised in that the antioxidant additive includes a compound of the formula (V): $R_1(-(C+O)O-)k(CH_2)_l-S-(CH_2)_m(-OO(C=O)-)_n R_2$ where $R_1$ and $R_2$, which are the same of different, are $C_7-C_{23}$ alkyl, $C_7-C_{23}$ alkenyl, $R_3-Ar-$, $Ar-R_3-$, or $AR-$, where $R_3$ is $C_8-C_{24}$ alkyl and Ar is $c_6-c_{14}$ aryl; k and n, which are the same of different, are 0 or 1, l and m, which are the same or different, are integers $\geq 0$; with the proviso that the compound is free from phenolic groups; and that the compositions is free from compounds having the formula (VI): $R-O-(C=O)-CH_2CH_2SCH_2CH_2-(C=O)-O-R$ where R is a $C_8-C_{20}$ alkyl group.

8 Claims, No Drawings

FOREIGN PATENT DOCUMENTS

| | | |
|---|---|---|
| EP | 0 538 033 A1 | 4/1993 |
| EP | 0 540 075 A1 | 5/1993 |
| EP | 0 420 271 B1 | 12/1994 |
| EP | 0 517 868 B1 | 11/1995 |
| EP | 0 688 794 A1 | 12/1995 |
| EP | 0 750 319 A1 | 12/1996 |
| FI | 980788 | 4/1998 |
| GB | 942369 | 11/1963 |
| GB | 2 028 831 A | 3/1980 |
| JP | 63-279503 | 11/1988 |
| JP | 353509/1992 | 12/1992 |
| WO | WO 91/09075 | 6/1991 |
| WO | WO 92/12182 | 7/1992 |
| WO | WO 92/13029 | 8/1992 |
| WO | WO 95/10548 | 4/1995 |
| WO | WO 97/03124 * | 1/1997 ............ C08L/23/04 |

OTHER PUBLICATIONS

JP 2–235740 abstract. Jujo Paper Co Ltd, Sep. 18, 1990, abstract, Figure 1. Japan, vol. 14, No. 552, M–1056.

JP 06340036 A abstract. Goyo PaperWorking Co Ltd, Dec. 13, 1994. Japan, vol. 94, No. 12.

JP 01100803 A2 abstract. STN International, File CAPLUS, CAPLUS accession No. 1989–555983, Doc. No. 111:155983, Hitachi Cable, Ltd.: "Hindered amine–containing crosslinked polyethylene electric insulators for cables and wires": Apr. 19, 1989.

JP 56065667 A abstract. Jun. 3, 1981.

WPI, Derwent Accession No. 90–326069, Jujo Paper MFG KK: "Blank for paper container for food packaging—comprises paper board, thermoplastic layer laminated for outside of container and two resin layers contain deodorise;" & JP A 2235740, 900918.+, Sep. 1990.

File WPI, Derwent accession No. 77–85827Y, Sumitomo Chem Co Ltd: "Straight chain ethylene copolymers prepn.— by copolymerising ethylene, polyalkylene glycol mono–acrylate and ethylenically unsaturated monomer," JP, A, 52126495, 441024, DW7748, Oct. 1977.

Saikkonin, Mikka. "Extrusion of slotted core elements," *Wire Technology International*, Nov. 1995.

Williams et al., Polymers Letters, vol. 6, pp. 621–624 (1968).

* cited by examiner

COMPOSITION FOR ELECTRIC CABLES COMPRISING THIODIOL FATTY ACID DIESTERS

This application is a continuation of international application No. PCT/SE99/01196, filed Jul. 1, 1999.

FIELD OF THE INVENTION

The present invention relates to a composition for electric cables, more particularly a composition for an insulating layer of an electric cable, preferably a medium- or high-voltage electric cable. The composition contains an ethylene plastic and additives including a peroxide cross-linking agent and antioxidant additives.

BACKGROUND OF THE INVENTION

Electric cables and particularly electric power cables for medium and high voltages may be composed of a plurality of polymer layers extruded around the electric conductor. In power cables the electric conductor is usually coated first with an inner semiconductor layer followed by an insulating layer, then an outer semiconductor layer followed by water barrier layers, if any, and on the outside a sheath layer. The layers of the cable are based on different types of ethylene plastics which usually are crosslinked.

The insulating layer of an electric cable is composed of ethylene plastic. By the expression "ethylene plastic" is meant, generally and in connection with the present invention, a plastic based on polyethylene or a copolymer of ethylene, wherein the ethylene monomer constitutes the major part of the mass. Thus, polyethylene plastics may be composed of homopolymers or copolymers of ethylene, wherein the copolymers may be graft copolymers or copolymers of ethylene and one or more monomers which are copolymerisable with ethylene. LDPE (low-density polyethylene, i.e. polyethylene prepared by radical polymerisation at a high pressure) is today the predominant cable insulating material. As mentioned above the ethylene plastic may also be an ethylene copolymer, and in that case it includes from 0 to about 25% by weight, preferably about 1–15% by weight of one or more comonomers which are copolymerisable with ethylene. Such monomers are well known to those skilled in the art and no extensive enumeration will be required, but as examples, mention can be made of vinylically unsaturated monomers, such as $C_3$–$C_8$ alpha olefins, for instance propene, 1-butene, 1-hexene, 4-methyl-1-pentene and 1-octene; $C_8$–$C_{14}$ non-conjugated dienes, for instance 1,8-octadiene and 1,10-decadiene; and vinylically unsaturated monomers containing functional groups, such as hydroxyl groups, alkoxy groups, carbonyl groups, carboxyl groups and ester groups. Such monomers may comprise, for instance, (meth)acrylic acid and alkyl esters thereof, such as methyl-, ethyl- and butyl(meth)acrylate; vinylically unsaturated, hydrolysable silane compounds, such as vinyl trimethoxy-silane; vinyl acetate etc. However, if the ethylene plastic is an ethylene copolymer the amount of polar comonomer should be kept at a minimum such that the polar comonomer comprises at most 10% by weight of the total ethylene plastic composition. Besides the additives described in more detail below, the remainder of the composition according to the present invention is made up of one or more of the ethylene plastics specified above. This means that the amount of ethylene plastic in the composition should lie in the range from about 95% by weight to about 98.8% by weight of the composition.

In order to improve the physical properties of the insulating layer of the electric cable and to increase its resistance to the influence of different environmental conditions, the ethylene plastic contains additives the total amount of which usually is about 0.2–5% by weight, preferably about 0.3–4% by weight. These additives include stabilising additives such as anti-oxidants to counteract decomposition due to oxidation, radiation, etc.; lubricating additives, such as stearic acid; additives for water-tree resistance, such as polyethylene glycol, silicones, polyglyceryl esters etc.; and crosslinking additives such as peroxides which decompose upon heating and initiate crosslinking of the ethylene plastic of the insulating composition, optionally used in combination with unsaturated compounds having the ability to form crosslinks when initiated by radical forming agents.

There is a large number of different additives and the number of possible combinations thereof is almost unlimited. When selecting an additive for a polymer composition the aim is to optimise the positive properties as much as possible, while any negative properties should be minimised. However, it is usually very difficult or even impossible to completely eliminate the negative properties that may accompany an additive. It must therefore be regarded as considerable technical progress if, in view of the number of different additives and the possible combinations thereof, a combination could be found which shows the advantages of prior-art additives without any of their disadvantages.

Known types of antioxidants are sterically hindered phenols, aromatic amines, organic phosphites, and thio compounds.

One such known antioxidant for polyethylene and other plastic resins is 4,4'-thio-bis(6-tert-butyl-m-cresol) and has the formula (I):

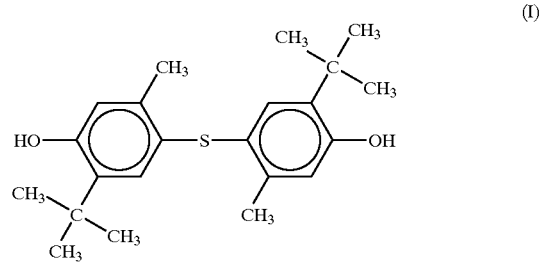

This antioxidant can be obtained from several suppliers under different trademarks, one of which is SANTONOX® from Monsanto Co. The compound is known to be very efficient in improving the thermal ageing properties of cable insulation, and it is also known to be incorporated into the polymer network when crosslinking a composition with a peroxide of type dicumyl peroxide, thus reducing any risk for depletion of the antioxidant from the cable insulation during service. It also reduces the risk for premature crosslinking in a crosslinkable composition during extrusion. When used for insulating layers of electric cables (I) is usually added to the polyethylene base resin in an amount between about 0.1–0.5% by weight, depending on the degree of thermooxidative stress expected. In some cases the use of (I) may be accompanied by undesired side-effects, however, where higher loadings are required due to higher thermooxidative stress. Thus, since the solubility of (I) in polyethylene is limited, it tends at higher loadings to be partly sweated out, thereby generating dust on the surface of the pellets of the polymer composition to which it has been added. This dust may constitute a health hazard and is therefore negative from an environmental point of view. Further these dust particles of (I) have so high melting point that they do not melt at temperatures commonly used for simultaneous extrusion and crosslinking of polyethylene materials and may therefore appear in the extruded polymer insulation as particles or grains and make it inhomogeneous. In view of these disadvantages connected with (I) it has been tried to find other additives which can replace it without having the disadvantages thereof.

One commonly used replacement for the antioxidant (I) is a combination of the additives with formulae (II) and (III), respectively, as shown below:

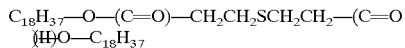
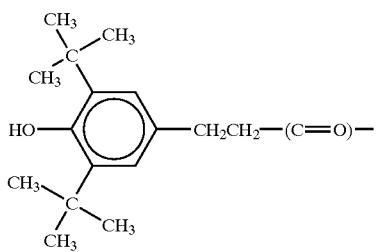
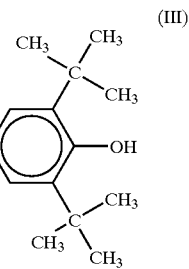

The compounds (II) and (III) are well known under the the tradenames IRGANOX® PS802 and IRGANOX® 1035, respectively. These antioxidants may be obtained from Ciba Specialty Chemicals. In HV-insulation compositions these two additives are used in an amount of about 0.1–0.5% by weight, preferably about 0.2% by weight of each in the polymer composition. Even though this additive combination eliminates some of the disadvantages of (I), it sometimes gives rise to undesired, premature crosslinking during extrusion of the polymer composition, which appears as so-called scorch, i.e. as inhomogeneity, surface unevenness and possible discoloration, in the insulation layer of the finished cable.

In an attempt to eliminate the scorch problem when using the antioxidant combination of (II) and (III) a third additive of the formula:

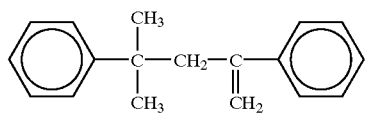

has been added. The compound (IV) can be obtained from Nippon Oils and Fats under the tradename Nofmer MSD. This compound serves both by converting highly reactive radicals formed by peroxide decomposition into less reactive ones, thereby reducing the scorch tendency, and by forming grafted bridges between polymer chains, thereby increasing the ultimate degree of crosslinking. The combination of the three additives (II), (III) and (IV) has been successful in reducing the scorch problem and it has also increased the final crosslinking degree of the polymer composition.

However, a disadvantage of this prior art combination of additives is that the polymer composition containing them for some applications may show an undesirably high moisture or water content. In view of the fact that moisture can lead to the formation of so-called water trees in polymer layers of electric power cables, which trees in turn markedly increase the risk of electrical breakdown, it is a strong desire to keep the moisture level as low as possible. The reason for this effect is probably that (II) is prone to form acidic degradation products when submitted to thermooxidative stress. Such acidic substances have the effect of promoting the generation of moisture by reaction with the cumyl alcohol formed upon decomposition of the dicumyl peroxide used as crosslinking agent.

SUMMARY OF THE INVENTION

It has now been found that the above mentioned disadvantages with prior art antioxidants can be mitigated, if not eliminated, by a new non-phenolic antioxidant. With the antioxidant of the present invention it is thus possible to achieve the advantages of the prior art additives mentioned above, without any of their disadvantages. This must be considered an important and surprising technical progress, especially in view of the large number of additives and combinations thereof that are previously known.

More particularly the present invention provides a composition for an insulating layer of an electric cable, which composition contains up to about 5% by weight of additives including antioxidant and peroxide cross-linking agent, the remainder of the composition consisting of an ethylene plastic, characterised in that the antioxidant additive includes a compound of the formula (V):

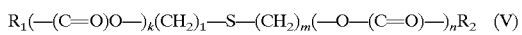

where $R_1$ and $R_2$, which are the same or different, are $C_7$–$C_{23}$ alkyl, $C_7$–$C_{23}$ alkenyl, $R_3$—Ar—, Ar—$R_3$—, or Ar—, where $R_3$ is $C_8$–$C_{24}$ alkyl and Ar is $C_6$–$C_{14}$ aryl;

k and n, which are the same or different, are 0 or 1, 1 and m, which are the same or different, are integers $\geq 0$;

with the proviso that the compound is free from phenolic groups;

and that the composition is free from compounds having the formula (VI):

where R is a $C_8$–$C_{20}$ alkyl group.

In the above formula (V) $R_1$ and $R_2$ are preferably the same and preferably represent $C_7$–$C_{23}$ alkyl, more preferable $C_{11}$–$C_{17}$ alkyl; k and n are preferably both 1; 1 and m are preferably the same and are preferably 1–4, more preferably 1–2. In formula (VI) lauryl, myristyl, palmityl, and stearyl may be mentioned as examples of R.

Other distinguishing features and advantages of this invention will appear from the following specification and the appended claims.

By using the non-phenolic antioxidant compound of the formula (V) and exclude any additives of the formula (VI) such as that of formula (II) (IRGANOX® PS802) the moisture content of the polymer composition, and thus the risk of water treeing, can be reduced quite substantially. The reason for this is probably that the compounds of formula (V) are less prone to form acidic degradation products when submitted to thermooxidative stress than the compounds of formula (VI).

Besides substantially reducing the generation of moisture, the antioxidant/Nofmer MSD additive combination of the present invention confers the advantage that the amount of peroxide crosslinking agent used may be reduced compared to the amount normally used, and still give same degree of crosslinking. Considering that the peroxide crosslinking agent is an expensive component of the composition, and that its degradation products methane (fire hazard) and cumyl alcohol (source of water) are undesirable, it is a substantial advantage to be able to reduce the amount thereof.

In addition to the above-mentioned advantages the antioxidant additive according to the present invention also gives a good antioxidation effect; it forms no dust; it does not give any scorch problem; it gives a good crosslinking degree of the final polymer composition; and it gives the polymer composition good heat ageing properties.

DETAILED SPECIFICATION OF THE INVENTION

As has already been mentioned, the composition of the present invention includes a base polymer of ethylene plastic as defined above.

In addition to the ethylene plastic base polymer, the composition of the invention includes as an anti-oxidant additive at least the compound of formula (V) defined above. The amount of the antioxidant additive of formula (V) in the composition should generally lie in the range of 0.1–0.5% by weight, preferably 0.15–0.35% by weight of the composition.

The antioxidant additive of formula (V) may be combined with other antioxidants, such as sterically hindered phenols. According to a preferred embodiment of the invention the antioxidant additive of formula (V) is combined with an antioxidant of formula (III). The amount of such optionally added other antioxidants should generally lie in the range of 0.1–0.5% by weight, preferably 0.15–0.35% by weight of the composition.

The antioxidant additive of formula (V) according to the present invention may also be combined with other types of additives, such as scorch retarders, and according to another preferred embodiment of the invention the antioxidant additive of formula (V) is combined with a scorch retarder of formula (IV). The amount of scorch retarder additive, such as that of formula (IV) should generally lie in the range 0.1–1.0% by weight, preferably 0.2–0.5% by weight of the composition. More than about 1.0% by weight of scorch retarder is not recommended, since when present in this amount the scorch retarder tends to interfere in a negative way with the crosslinking reaction of the polymer composition.

In addition to the above-mentioned ethylene plastic base polymer and additives, the composition of the present invention also includes a peroxide crosslinking agent. This crosslinking agent may be selected among known peroxide crosslinking agents, preferably among those decomposing at temperatures in the range from about 160° C. to about 180° C. Some different peroxide cross-linking agents having this decomposition range are known, such as dicumyl peroxide and bis(t-butylperoxy)di-iso-propyl benzene. The preferred peroxide crosslinking agent of the present invention is dicumyl peroxide. The amount of peroxide crosslinking agent used in the composition according to the invention is preferably about 1.0–2.4% by weight, more preferably about 1.1–1.9% by weight, and most preferably about 1.2–1.8% by weight of the composition. In this connection it should be mentioned that due to the fact that the additive combination of the invention leads to more effective crosslinking it is possible to use less peroxide crosslinking agent in the composition of the invention than is used conventionally. Thus, the amount of peroxide crosslinking agent may be reduced by about 0.2–0.4% by weight in the invention compared to the amount normally used in prior-art compositions.

As has already been mentioned, the compoisition according to the invention may include further additives such as water-tree resistance additives, lubricating agents, and the like. Such conventional additives are included in the overall additive amount of up to about 5% by weight according to the present invention. Water-tree resistance additives, such as polyethylene glycol, may for instance constitute about 0.1–1% by weight of the composition.

To further facilitate the understanding of the invention, some illustrating, non-restrictive Examples and comparative Examples will be given below. All parts and percentages refer to weight, unless otherwise stated. In the Examples all parts and percentages are by weight, unless otherwise stated.

EXAMPLE 1

Four polymer compositions for insulating layers of electrical cables were produced. For all the compositions a radical initiated high pressure ethylene polymer (LDPE of density 922 kg/m$^3$ and MFR$_2$ of 2 g/10 min) was used as the ethylene plastic base resin. To this base resin different additives were added for the different compositions. In each instance 0.4% by weight of the additive (IV) was added as a scorch retarder and 1.5% by weight of dicumyl peroxide was added as crosslinking agent. Further, combinations of additives according to the formulae (I), (II), (III) and (V) were added in various amounts as is shown in Table 1. Each of the compositions 1a–1d was made into films and crosslinked at 250° C. for 40 min. Thereafter the decomposition product α-methylstyrene from the dicumylperoxide was determined for each film. As the amount of α-methylstyrene is directly related to the amount of moisture formed, the amounts of α-methylstyrene given in Table 1 were taken as measures of the moisture formed.

As is evident from the data in Table 1, the amount of moisture is reduced substiantially for the compositions according to the invention. Thus, the amount of moisture in Example 1c and 1d according to the invention is only about 10–15% of that according to the comparative Example 1b.

TABLE 1

| Example No. | Dicup (%) | I Santonox (%) | II PS802 (%) | III 1035 (%) | IV MSD (%) | V 2,2'-thio-diglycol-distearate (%) | H$_2$O content* (ppm) |
|---|---|---|---|---|---|---|---|
| 1a (Comp.) | 1.5 | 0.2 | — | — | 0.4 | — | 987 |
| 1b (Comp.) | 1.5 | — | 0.2 | 0.2 | 0.4 | — | 3200 |
| 1c (Inv.) | 1.5 | — | — | 0.2 | 0.4 | 0.2 | 399 |
| 1d (Inv.) (Comp.) | 1.5 | — | — | 0.2 | 0.4 | 0.4 | 400 |

*Determined as α-methylstyrene

EXAMPLE 2

In this Example the heat-ageing properties were determined.

Three polymer compositions were made, containing the same base resin as the compositions in Example 1, but with an $MFR_2=0.9$ g/10 min. Also, all compositions contained 1.5% by weight of dicumyl peroxide as a cross-linking agent. In addition, one of the compositions (2a) contained 0.2% by weight of (I), while composition (2b) contained 0.2% by weight of (III), 0.4% by weight of(IV) and 0.2% by weight of (V), and composition 2c contained 0.2% by weight of (III), 0.4% by weight of IV and 0.4% by weight of (V). Compositions 2b and 2c were according to the invention. Dumbbell test pieces were made of the compositions and tested for thermo-oxidative ageing at 150° C. for various periods of time. The ultimate tensile strength at break and the ultimate elongation at break of the compositions were determined before the testing started and subsequently at predetermined time intervals. In Table 2 the values are expressed as percent retained ultimate tensile strength at break and percent retained ultimate elongation at break, the initial values (ageing time 0 days) being given as 100%. The requirement that the retained ultimate tensile strength (RUTS) and retained ultimate elongation (RUE) after 10 days at 150° C. should not be lower than 75% is becoming increasingly common. The testing was carried out in accordance with the International Standard IEC 811. The results are shown in Table 2.

TABLE 2

| Example No. | Ageing time at 150° C. (days) | RUTS (%) | RUE (%) |
|---|---|---|---|
| 2a (Comp.) | 0 | 100 | 100 |
| (0.2% I) | 10 | 102 | 105 |
| 2b (Inv.) | 0 | 100 | 100 |
| (0.2% III, 0.4% IV, 0.2% V) | 10 | 105 | 104 |
| 2c (Inv.) | 0 | 100 | 100 |
| (0.2% III, 0.4% IV, 0.4% V) | 10 | 105 | 102 |

From table 2 it is evident that the compositions according to the present invention are at least as good as if not better than the prior-art composition containing (i) as the antioxidant additive.

What is claimed is:

1. A composition for an insulating layer of an electric cable, wherein said composition includes a compound of the formula (V):

$$R_1(\!-\!(C\!=\!O)O\!-\!)_k(CH_2)_l\!-\!S(CH_2)_m(\!-\!O\!-\!(C\!=\!O)\!-\!)_nR_2 \quad (V)$$

where $R_1$ and $R_2$, which are the same or different, are $C_7$–$C_{23}$ alkyl, $C_7$–$C_{23}$ alkenyl, $R_3$—Ar, Ar—$R_3$, or Ar—, where $R_3$ is $C_8$–$C_{24}$ alkyl and Ar is $C_6$–$C_{14}$ aryl;

k and n are 1; and l and m, which are the same or different, are integers>0, with the proviso that the compound is free from phenolic groups, wherein said composition contains less than about 5% by weight of additives including 0.1 to 0.5% by weight of the compound of formula (V) and 1.0 to 2.4% by weight of peroxide cross-linking agent, wherein the remainder of the composition consists of an ethylene plastic, wherein the composition is free from compounds having the formula (VI):

$$R\!-\!O\!-\!(C\!=\!O)\!-\!CH_2CH_2SCH_2CH_2\!-\!(C\!=\!O)\!-\!O\!-\!R \quad (VI)$$

where R is a $C_8$–$C_{20}$ alkyl group, and wherein the inclusion of the compounds of formula (V) and the exclusion of the compounds of formula (VI) function to reduce the moisture content of the composition.

2. A composition as claimed in claim 1, characterised in that the compound of formula (V) is $$C_{17}H_{35}\!-\!(C\!=\!O)O\!-\!CH_2CH_2SCH_2CH_2\!-\!O\!-\!(C\!=\!O)\!-\!C_{17}H_{35}.$$

3. A composition as claimed in claim 1, characterised in that the additives includes 0.1–0.5% by weight of a sterically hindered phenolic compound.

4. A composition as claimed in claim 3, wherein the sterically hindered phenolic compound has the formula (III):

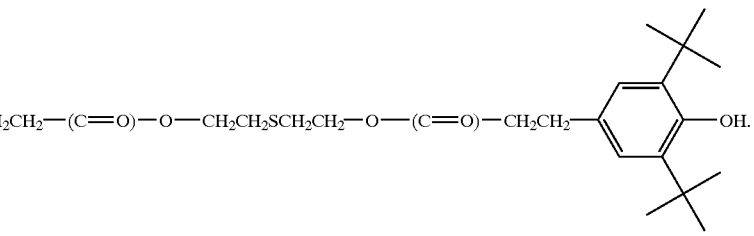

(III)

5. A composition as claimed in claim 1, characterised in that the additives include 0.2–1.0% by weight of a scorch retarder of the formula (IV)

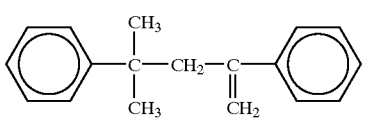

(IV)

6. A composition as claimed in claim 1, characterised in that the peroxide crosslinking agent is dicumyl peroxide.

7. A composition as claimed in claim 1, characterised in that the ethylene plastic is low-density polyethylene.

8. A Composition as claimed in claim 1, characterised in that the ethylene plastic includes up to 25% by weight or comonomer.

* * * * *